Sept. 26, 1961     D. S. CARY     3,002,092
OPTICAL SYSTEM FOR INFRARED TARGET TRACKING APPARATUS
Filed Sept. 30, 1954
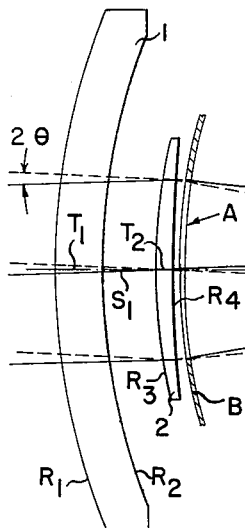
Fig. 1
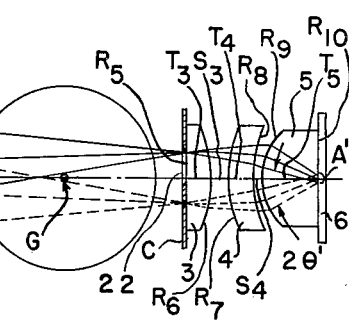
Fig. 2
| LENS | N(2.6u) | RADII mm | THICKNESS mm | SPACING mm |
|---|---|---|---|---|
| 1 | 1.528 | $R_1 = +65.63$ | $T_1 = 5.14$ | |
| | | $R_2 = +60.49$ | | $S_1 = 5.08$ |
| 2 | 2.415 | $R_3 = +60.24$ | $T_2 = 2.03$ | |
| | | $R_4 = +172.45$ | | $S_2 = 65.43$ |
| 3 | 2.415 | $R_5 = \infty$ | $T_3 = 2.11$ | |
| | | $R_6 = -34.88$ | | $S_3 = 2.13$ |
| 4 | 2.415 | $R_7 = +11.24$ | $T_4 = 2.03$ | |
| | | $R_8 = +13.87$ | | $S_4 = .38$ |
| 5 | 2.415 | $R_9 = + 3.97$ | $T_5 = 5.60$ | |
| | | $R_{10} = \infty$ | | |
EF OF LENSES 1 & 2 = 68.42 mm
EF OF LENSES 3, 4 & 5 = 2.90 mm
Fig. 3
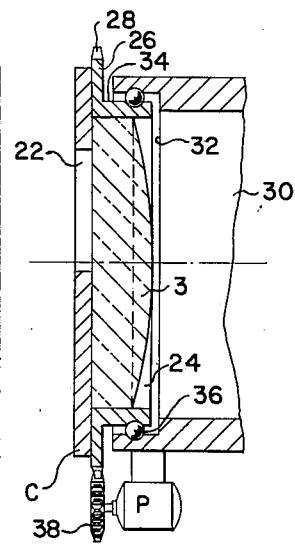
DONALD S. CARY
INVENTOR.
BY *G. D. O'Brien*
*Q. Baxter Warner*
ATTORNEYS

United States Patent Office 3,002,092
Patented Sept. 26, 1961

3,002,092
OPTICAL SYSTEM FOR INFRARED TARGET
TRACKING APPARATUS
Donald S. Cary, Rochester, N.Y., assignor, by mesne assignments, to the United States of America as represented by the Secretary of the Navy
Filed Sept. 30, 1954, Ser. No. 459,565
7 Claims. (Cl. 250—83.3)

This invention relates to target tracking apparatus and more particularly to an improved optical system for transmitting infrared energy emitted or reflected by a target to a suitable infrared detection means which will convert it to an electric signal suitable for missile guidance.

It is an object of the present invention to provide an optical system for an infrared tracking apparatus in which the refracting elements have a high refractive index and good infrared transmission characteristics.

The use of high index material permits large surface refracting power, and hence increased collecting efficiency with simple elements. Also, by optically immersing the detector in a material of high index, the optical speed of gain of the system can be increased. As is known by those skilled in the art, the spectral region of useful operation for such optical tracking devices is limited by the absorption of the optical material, the spectral response of the detector and the tolerable chromatic aberration of the optical system. It is, therefore, a further object of the present invention to provide an optical system in which the undesirable effects of the above enumerated factors are minimized.

My invention, hereinafter fully described, is disclosed in the accompanying drawing in which:

FIG. 1 shows an optical system for an infrared target tracking apparatus according to the invention in which the scale of some elements has been enlarged in order to facilitate comprehension of the disclosure;

FIG. 2 gives data for the optical system illustrated in FIG. 1; and

FIG. 3 is an enlarged section view of the rotary mount for the scanning mask and field lens of my invention.

The optical system according to my invention accepts incident flux or light energy through an entrance pupil of Area A, and over a half field angle $\theta$. This incident flux is formed into an image of infinity by a primary objective, and it is in this primary focal plane where every point corresponds to a point at infinity that the flux is modulated by a suitable light chopper. If the relative aperture and field of the primary objective are kept sufficiently small, suitable image quality can be obtained with a simple refracting lens. After being chopped, the flux is condensed onto an infrared sensitive detector with maximum obtainable concentration. For greatest efficiency, the entrance pupil is imaged in the plane of the detector at a fractional magnification of $1/m$, where $m$ is greater than unity, and the image produced just fills the detector with light. Provided that all the field rays passing through the entrance pupil eventually fall on the detector, the flux concentration or optical gain will be $m^2$, the ratio of entrance pupil to detector area. Accordingly, except for transmission losses, the target signal intensity is amplified $m^2$ times by the optical system.

The limiting value of $m$ can be obtained from the basic law of photometry which asserts the constancy of total flux at any point in a beam traversing an optical system. Mathematically, it can be stated for axial systems as:

$$N^2 \sin^2 \theta A = N'^2 \sin^2 \theta' A' \tag{I}$$

where $N$ and $N'$ are the refractive indices at any two points along the beam, $\theta$ and $\theta'$ are the half-cone angles at the two points, and A and A' are the corresponding beam areas. Therefore, $$m^2 = \frac{A}{A'} = \frac{N'^2 \sin^2 \theta'}{N^2 \sin^2 \theta} \tag{II}$$

Since the maximum value of $\theta'$ is 90°, the limiting $m$ in any system is given by, $$m^2 = \frac{N'^2}{N^2} \frac{1}{\sin^2 \theta} \tag{III}$$

where $\theta$ is the half-field angle of the primary objective. From Equation II, it will be noted that $m^2$, the optical gain of the system, is proportional to $N'^2$. Therefore, if the value of $\theta'$ is unchanged, "immersing" the detector in a medium of high index $N'$ will increase the optical gain by $N'^2$ provided the detector is scaled down to the smaller image size.

If the optical system is designed to image the full field of view simultaneously, the tracking problem is eliminated. However, as the half-field angle $\theta$, is increased, the maximum obtainable concentration of flux $m^2$ is reduced according to relationship of Equation III, supra.

The optical system of my invention is designed primarily as the seeker head for an air-to-air rocket although its principle could be applied to other applications where high optical efficiency of a photoelectric detector is desired. It is designed to operate in the 2–3 micron region of the infrared, using lead sulfide as a detector.

The system, as shown in FIG. 1, consists of a low field telescope which is gyro-stabilized so as to track a target anywhere in a ±20° field of view. It sights through a stationary nose lens or window 1, which is concentric about the center of rotation G of a gyro system so that the image quality is uniformly affected at all points in the field. Ideally window 1 should be made from a material such as arsenic trisulfide which is free from absorption in the 2–3 micron region, but for mechanical reasons, I prefer to make it from Corning 0160 glass known to the trade as "Steuben glass" which has some but not prohibitive absorption in this region of the infrared.

Incident flux passing through nose window 1 and a primary objective or convex meniscus lens or element 2 is masked by a rectangular auxiliary mask B. Mask B is provided with sufficient spherical curvature to compensate for the field curvature of the collecting lenses or elements 3, 4 and 5, and thereby permits the use of a flat rectangular lead sulfide detector 6. It is to be understood, however, that in some applications mask B can be eliminated and that the mounting for objective lens 2 can serve as the auxiliary mask for the optical system. The plano surface of element 3, a plano-convex field lens, which faces primary objective 2, forms an image plane for objective 2. Flux passing through element 3 is condensed by an aplanatic collector onto the flat surface of detector 6. The flat surface of detector 6 is conjugate to mask B with respect to lenses 3, 4 and 5. The aplanatic collector comprises convex meniscus collecting lens 4 and plano-convex collecting lens 5, each of which contributes negligible spherical aberration and coma for a point image on axis because it is functioning at its aplanatic point.

A scanning mask C provided with a radial slot or aperture 22 is cemented, laminated or otherwise affixed immediately adjacent the plano surface of field lens 3. Mask C and field lens 3 are rotated as a unit about the optical axis of said field lens 3, as will hereinafter be described with reference to FIG. 3.

Field lens 3 is mounted in an annular ring 24 which is L-shaped in cross section. The radial leg 26 of ring 24 is provided with a series of gear teeth 28 which extend circumferentially about the periphery thereof. A cylindrical tube 30 symmetrically positioned with respect to lenses 4 and 5, is provided with an annular recessed shoulder 32 in the end portion thereof. The circumferential surface of shoulder 32 and the circumferential surface on transverse leg 34 of ring 24 which is positioned in opposed relation thereto are grooved to receive bearing balls 36 which serve to retain ring 24 within cylinder 30. A motor P which is fixed relative to cylinder 30 causes mask C and field lens 3 to rotate about the optical axis of lens 3 by driving ring 24 through teeth 28 and the meshing teeth of a gear 38 which is driven by motor P. The apertured mask C when rotating acts as a light chopper for modulating the incident flux at the image or focal plane of primary objective 2. It is to be understood that the specific shape of slot 22 in mask C does not form a part of the present invention and that a mask having any suitably shaped aperture which when rotated will act as a light chopper can be utilized.

Primary objective 2 is formed of arsenic trisulfide and images infinity over a ±2° field on the plano surface of field lens 3. The thin lens aberrations of objective 2 have been computed and are tabulated below for a 66 mm. focal length:

| | Mm. |
|---|---|
| Transverse spherical aberration | .082 |
| Coma | .009 |
| Chromatic blur circle (2–3 micron) | .115 |
| Longitudinal astigmatism (2°) | .080 |

The effect of each of these aberrations can be somewhat reduced by appropriate refocusing.

If desired, the effect of chromatic aberration may be decreased in one of the following ways:

(1) By designing a compound objective which is achromatic over the useful spectral region. This can be done by combining infrared transparent media which have different dispersive powers (where $$\text{dispersive power} = \frac{dN}{N-1}$$

$dN$ being the refractive index difference over the range considered).

(2) By designing a simple objective using a material with lower dispersive power in the desired spectral region. For instance, the dispersive power of silver chloride is about 45% less than the corresponding figure for arsenic trisulfide, in the 2–3 micron region.

(3) By increasing the focal length of the objective, thereby decreasing its relative aperture. The collector system would require only slight modification to maintain its original efficiency.

(4) By substituting a spherical mirror for the refracting objective, thus eliminating all the chromatic aberration of the objective. The spherical aberration of such a mirror is less than the aberration for a simple lens of equivalent focal length and relative aperture.

Field lens 3 and collecting elements 4 and 5 are all formed of arsenic trisulfide. The focal length of the field lens 3 is chosen to give a 1.592× minification of the entrance pupil image. The thin lens aberrations of the field lens 3 have been computed and are tabulated below in angular units:

| | |
|---|---|
| Image subtent | .1719 |
| Transverse spherical aberration | .0010 |
| Coma | .0013 |
| Chromatic blur circle (2–3 micron) | .0013 |
| Astigmatic blur circle | .0065 |

As is known by those skilled in the art, the effect of each of these aberrations may be reduced by proper focusing. By selecting the proper astigmatic focus the effect of astigmatism becomes negligible. However, even with these aberrations, the energy lost amounts to only a few percent of the total energy received by the optical system.

The minification of the elements 4 and 5 amounts to $(2.4)^3$ or 13.82× when each element is formed of arsenic trisulfide. Thus each dimension of the final image formed on the plano surface of element 5 is 1.592 times 13.82 or 22× smaller than the corresponding dimension of the entrance pupil. This amounts to a flux concentration of 484×. The ¾ mm. square lead sulfide detector 6 is mounted immediately adjacent to and preferably in optical contact through optical immersion with the plano surface of the collecting element 5. The optical contact of the detector and element 5 permits the full utilization of the optical efficiency of the optical system, according to the present invention. The reflection losses which occur at the other air-glass interfaces are greatly reduced by coating the surfaces with silicon monoxide, or other suitable material, as is known by those skilled in the art. The data for this system is as follows:

| Lens | N (2.6μ) | Radii, mm. | Thickness, mm. | Spacing, mm. |
|---|---|---|---|---|
| 1 | 1.528 | $R_1 = +65.63$ | $T_1 = 5.14$ | |
| | | $R_2 = +60.49$ | | $S_1 = 5.08$ |
| 2 | 2.415 | $R_3 = +60.24$ | $T_2 = 2.03$ | |
| | | $R_4 = +172.45$ | | $S_2 = 65.43$ |
| 3 | 2.415 | $R_5 = \infty$ | $T_3 = 2.11$ | |
| | | $R_6 = -34.88$ | | $S_3 = 2.13$ |
| 4 | 2.415 | $R_7 = +11.24$ | $T_4 = 2.03$ | |
| | | $R_8 = +13.87$ | | $S_4 = .38$ |
| 5 | 2.415 | $R_9 = +3.97$ | $T_5 = 5.60$ | |
| | | $R_{10} = \infty$ | | |

EF of Lenses 1 and 2=68.42 mm.
EF of Lenses 3, 4 and 5=2.90 mm.

Rewriting this data in terms of the effective focal length of lenses 1 and 2 results in the following tabulated data:

| Lens | N | EF | Radius | Thickness | Spacing |
|---|---|---|---|---|---|
| 1 | 1.528 | $F_1$ | $R_1 = +.959\ F_1$ | $T_1 = .075\ F_1$ | |
| | | | $R_2 = +.884\ F_1$ | | $S_1 = .074\ F_1$ |
| 2 | 2.415 | | $R_3 = +.880\ F_1$ | $T_2 = .030\ F_1$ | |
| | | | $R_4 = +2.520\ F_1$ | | $S_2 = .956\ F_1$ |
| 3 | 2.415 | .042 | $R_5 = \infty$ | $T_3 = .031\ F_1$ | |
| | | | $R_6 = -.509\ F_1$ | | $S_3 = .031\ F_1$ |
| 4 | 2.415 | $F_1$ | $R_7 = +.164\ F_1$ | $T_4 = .030\ F_1$ | |
| | | | $R_8 = +.203\ F_1$ | | $S_4 = .006\ F_1$ |
| 5 | 2.415 | | $R_9 = +.057\ F_1$ | $T_5 = .082\ F_1$ | |
| | | | $R_{10} = \infty$ | | |

Several distinct advantages are offered by the optical system of my invention in comparison with the conventional systems heretofore employed. First, the scattered light problem is minimized because of the relatively small entrance pupil and the adaptability of the system to suitable baffles. Second, there is little or no vignetting problem because of the straight through refracting system of low field employed. Third, the optical system produces a 484× flux concentration, which is equivalent to the collecting power of an f/0.65 photographic objective over a ±2° field and fourth, the optical system is comparatively easy to mount and gyro-stabilize, and comparatively inexpensive to manufacture because of the utilization of relatively small and simple lenses of inexpensive materials, which eliminate infrared absorption in the system.

Although in the illustrated embodiment of my invention the lenses are designed for arsenic trisulfide ($As_2S_3$), with an average refractive index of substantially 2.4, several alternate materials such as selenium with an average index of 2.45, germanium with an average index of 4.0, arsenic selenide with an average index of 3.0, and silver chloride with an average index of 2.0, may also be utilized. Thus these and other variations of the illustrated embodiment of my invention are possible, and will be readily recognized by those skilled in the art, and, therefore, the present disclosure is intended to be illustrative only, and the scope of the invention is defined by the appended claims.

What I claim and desire to secure by Letters Patent of the United States is:

1. An improved optical system for transmitting infrared energy received from a target to infrared responsive detection means comprising in spaced optical alignment, a spherical window with the convex surface thereof directed toward said target, a convex meniscus objective element with the more strongly curved surface thereof directed toward said target, a mask for said objective element and provided with an aperture, a plano-convex field element with the plano surface thereof lying in the focal plane of said objective element and directed toward said target, a scanning mask provided with an aperture and positioned in said focal plane adjacent said plano surface for modulating the infrared energy received from said target, a convex meniscus collecting element with the more strongly curved surface thereof directed toward said target, a plano-convex collecting element with the curved surface thereof directed toward said target, and an infrared responsive detection means having a surface lying immediately adjacent the plano surface of said plano-convex collecting element and in a plane conjugate to said mask for said objective with respect to said elements between said focal plane and said means.

2. An improved optical system in accordance with claim 1 in which said plano surface of said plano-convex collecting element is mounted in optical contact with said surface of said detection means.

3. An improved optical system in accordance with claim 2 in which said elements are formed of arsenic trisulfide having an average refractive index of approximately 2.4 for the 2.6 micron wavelength of the infrared.

4. An improved optical system in accordance with claim 3 in which each said collecting element functions at its aplanatic point and in which the minification of said field element together with said collecting elements is substantially 22 times.

5. An improved optical system in accordance with claim 1 and including means for rotating said scanning mask in said focal plane of said objective about the optical axis of said field element.

6. An improved optical system in accordance with claim 1 in which said scanning mask is rigidly attached to said plano surface of said field element and means for rotating said scanning mask and said field element as a unit about the optical axis of said field element.

7. An improved optical system for transmitting infrared energy, substantially according to the following specifications:

| Lens | N | EF | Radius | Thickness | Spacing |
|---|---|---|---|---|---|
| 1 | 1.528 | $F_1$ | $R_1 = +.959 F_1$ | $T_1 = .075 F_1$ | |
| | | | $R_2 = +.884 F_1$ | | $S_1 = .074 F_1$ |
| 2 | 2.415 | | $R_3 = +.880 F_1$ | $T_2 = .030 F_1$ | |
| | | | $R_4 = +2.520 F_1$ | | $S_2 = .956 F_1$ |
| | | | $R_5 = \infty$ | | |
| 3 | 2.415 | .042 $F_1$ | $R_6 = -.509 F_1$ | $T_3 = .031 F_1$ | $S_3 = .031 F_1$ |
| | | | $R_7 = +.164 F_1$ | | |
| 4 | 2.415 | | $R_8 = +.203 F_1$ | $T_4 = .030 F_1$ | |
| | | | $R_9 = +.057 F_1$ | | $S_4 = .006 F_1$ |
| 5 | 2.415 | | $R_{10} = \infty$ | $T_5 = .082 F_1$ | | where the first column designates the window and lens elements by Arabic numbers in order from front to rear and where $F_1$ is the focal length of the unit comprising lenses 1 and 2, N is the index of refraction for the 2.6 micron wavelength of the spectrum, R, T, and S refer respectively, to the radii of curvature of the refractive surfaces, the thickness of the elements, and the air spaces between the elements, the subscripts on these refer to the surfaces, the elements, and the spaces numbered consecutively from the front, and the + and − signs in the fourth column correspond to surfaces which are respectively convex and concave to the front.

No references cited.